United States Patent [19]

Konomi et al.

[11] 3,924,445
[45] Dec. 9, 1975

[54] FLOW RATE MEASURING SYSTEM WITH CALIBRATION MEANS

[75] Inventors: Toshiaki Konomi, Susono; Akio Takamura, Yokohama, both of Japan

[73] Assignees: Toyota Jidosha Kogyo Kabushiki Kaisha; Kabushiki Kaisha Ono Sokki Seiksakusho, both of Japan

[22] Filed: Sept. 27, 1974

[21] Appl. No.: 510,031

[30] Foreign Application Priority Data
Sept. 28, 1973  Japan.............................. 48-108556
Sept. 29, 1973  Japan.............................. 48-108921

[52] U.S. Cl. .......................................... 73/3; 73/213
[51] Int. Cl.² ...................... G01F 25/00; G01F 1/36
[58] Field of Search ................................ 73/3, 213

[56] References Cited
FOREIGN PATENTS OR APPLICATIONS
218,025   7/1924   United Kingdom...................... 73/3
402,954   12/1933  United Kingdom...................... 73/3

*Primary Examiner*—Richard C. Queisser
*Assistant Examiner*—John P. Beauchamp
*Attorney, Agent, or Firm*—Toren, McGeady and Stanger

[57] ABSTRACT

A flow rate measuring system comprises two venturis inserted successively in a flow passage for a fluid to be measured, a bypass passage connected in parallel with the flow passage and having two orifices inserted successively therein, a pressure converter with a calibrating means connected between both venturis, and a constant capacity pump connected between intermediate portions of the flow passage and the bypass passage. Calibration is effected by shutting fluid flow in the flow passage while maintaining said constant capacity pump in operation and connecting the pressure converter between the venturis. The pressure converter which generates an output signal representative of the fluid flow to be measured may thus be calibrated by adjusting the output signal to represent a fraction of the flow rate through the constant capacity pump.

12 Claims, 4 Drawing Figures

FLOW RATE MEASURING SYSTEM WITH CALIBRATION MEANS

BACKGROUND OF THE INVENTION

The present invention relates generally to a fluid flow rate measuring system and more particularly to a system for measuring fuel consumption in internal combustion engines.

Heretofore, in bench tests of internal combustion engines, a burette has been widely used as the most precise fuel consumption measuring device. More recently, a fluid flow meter utilizing venturis, constrictions and other means has been developed. However, inasmuch as this type of flow meter involves elements such as a pressure transducer, a constant capacity pump, venturis and the like which might vary in performance with time due to temperature and/or other factors, there arises a necessity for frequent calibration of such systems in order thay they will provide an accurate indication of measured values while in use.

In the calibration of such fluid flow meters, methods have been employed which involve passage of a steady flow through the meter, accumulation of fluid in a container and weighing of the fluid accumulated therein. However, such methods involve problems with regard to obtaining a steady flow and treating residual fuel in the fluid passages. It has thus been found troublesome and rather difficult technically to perform calibration with a high degree of precision.

The present invention aims at providing an improved fluid flow rate measuring system which is substantially free of the aforementioned problems. The principles of the present invention are based upon the findings that the constant capacity pump, which is a mechanical device, suffers only slight thermal expansion with change of temperature as compared with variation of resistivity and other factors and is also substantially free of effects from aging, while the pressure transducer, which operates electrically, is responsible for a substantial portion of the aging or deterioration of the flow meter. Based on these findings, the system is designed to determine the flow rate of the constant capacity pump with the pressure converter by shutting off flow into the system from the outside, so as to enable calibration of the pressure converter on the assumption that the flow rate of the constant capacity pump is constant.

SUMMARY OF THE INVENTION

According to the present invention, the inlet and outlet of a first passage having the fluid to be meaured flowing therethrough are connected, respectively, to a second and a third bypass passage which are arranged in parallel to said first passage. Two venturis are provided in said first passage, and a portion of the first passage between the venturis is connected through a constant capacity pump to the second and third passages. The flow rate of the fluid is measured by a pressure converter provided between the two venturis.

First and second valve means are provided to open and close the inlet and outlet, respectively, of the first passage. Third valve means are also provided at a location in the system whereby, upon closure of said first, second and third valve means with continued operation of the constant capacity pump, the reading on the pressure converter will be equivalent to a predetermined fraction of the flow rate through the constant capacity pump thereby permitting calibration of the pressure converter to reflect this value.

In one aspect of the invention, the third valve means is located within one of the bypass passages and the pressure converter is calibrated to a value equivalent to one-half the flow rate through the constant capacity pump.

In another aspect of the invention, the third valve means is located between one of the venturis and the pressure converter which is calibrated to a value equivalent to one-eighth the flow rate through the constant capacity pump.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
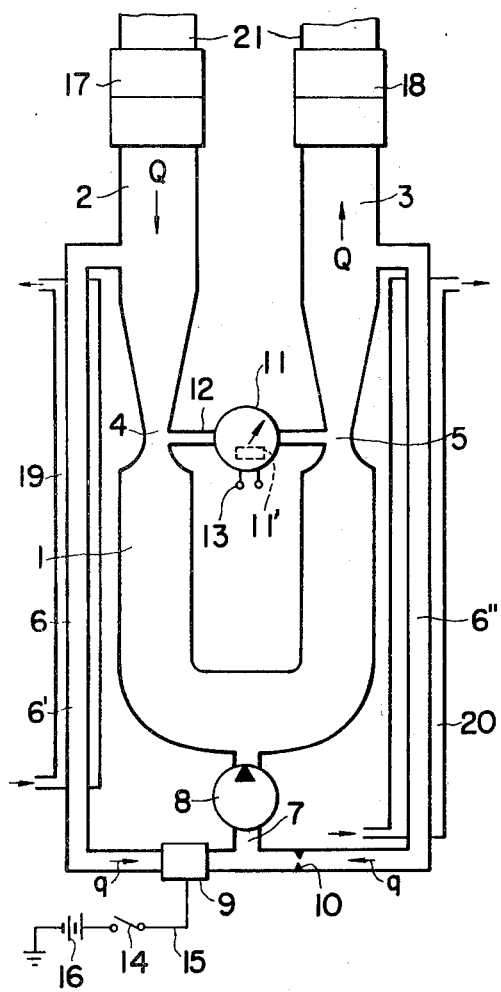
FIG. 1 is a diagram showing a fluid flow measuring system according to the present invention.

Referring first to FIG. 1, a fluid whose flow rate is to be measured is passed through a circuit 21 provided with a first passage means 1. Between an inlet 2 and an outlet 3 of said passage 1 there are provided two venturis 4 and 5 which are of the same size. First valve means 17 and second valve means 18 are provided to open and close the inlet 2 and the outlet 3, respectively. The passage 1 is connected to a bypass 6 in parallel thereto at two locations between the inlet 2 and the outlet 3. The bypass 6 is connected at its halfway point to the inlet port of a constant capacity pump 8 through a passage 7, with the outlet port of the pump 8 being connected into a part of the passage 1 between the two venturis 4 and 5. The portion of the bypass 6 positioned between the inlet 2 and the passage 7 constitutes a second passage means 6' while the portion between the outlet 3 and the passage 7 constitutes a third passage means 6".

A third valve means in the form of an solenoid valve 9 is provided in the passage portion 6' and a constriction 10 is provided in the passage portion 6". The solenoid valve 9 is adapted to provide the same throttling resistance as the constriction 10 to the fluid when the latter passes therethrough.

The throat of the venturi 4 and that of the venturi 5 are connected through a passage 12 to a pressure transducer 11 adapted to convert the pressure difference between the venturis 4 and 5 into an electrical signal. The pressure transducer 11 is provided with a calibrating means 11' for correcting the error of the measured value and is designed to emit a signal from its output terminal 13 to a flow rate indicator. The solenoid 9 is connected to a power source 16 through a conductor 15 provided with a switch 14 so that said solenoid valve 9 is operated by operation of the switch 14.

The inlet 2 and the outlet 3 of the system are connected respectively, to the circuit 21 through joints which include, respectively, the first and second valve means 17, 18, identified with similar reference numerals. Each of the joints 17 and 18 is designed such that when it is connected to the circuit 21, the valve therein is opened, and when disconnected, the valve therein is closed. These joints may be replaced by solenoid valves or manual valves. The passage portions 6' and 6" are enclosed by cooling means 19 and 20, respectively, through which cooling fluid is passed so that the fluid to be measured will remain unaffected by temperature of the pump and other elements.

According to the flow rate measuring system of the present invention, pressure difference between the two venturis 4 and 5 signifies the flow rate and the calibrating means 11' of the pressure converter 11 is adjusted to allow the system to indicate the measured values correctly no matter whether the system is subjected to the influence of temperature and/or other factors. These factors are discussed in detail hereinbelow.

It is here assumed that the pressure at a point in the passage 1 at which the fluid is discharged from the constant capacity pump 8 is $P_1$, and that the pressures in the throats of the venturis 4 and 5 are $P_2$ and $P_3$, respectively. If the switch 14 is open, the solenoid valve 9 is also kept open to allow passage therethrough of the fluid to be measured. The system is arranged such that the flow rate Q of the fluid to be measured, which is supplied into the inlet 2, is either greater than or equal to the flow rate q through the valve 9 and the constriction 10, respectively. The fluid in the passages 6' and 6" flows in the directions of arrows shown in the drawings.

Since there exists the relationship of $q \geq Q$ between the flow rate in the venturi 4 and the pressure drop, the following equation is given:

$$q - Q = C.\alpha \sqrt{\frac{2g(P_1 - P_2)}{\gamma}} \quad (1)$$

where C is a factor of the apparatus, $\alpha$ is flow coefficient, $\gamma$ is fluid density, and g is gravitational acceleration.

Since $C.\alpha$ is constant, it may be expressed as follows:
$$C^2 . \alpha^2 = K \ldots \quad 2$$
This gives:

$$q - Q = \sqrt{K} \sqrt{\frac{2g(P_1 - P_2)}{\gamma}} \quad (3)$$

Likewise, the following equation is given in the case of venturi 5:

$$q + Q = \sqrt{K} \sqrt{\frac{2g(P_1 - P_3)}{\gamma}} \quad (4)$$

If the square of the formula (4) is subtracted from the square of the formula (3), the following equation is obtained:

$$4qQ = \frac{2g}{\gamma} K(P_2 - P_3) \quad (5)$$

Hence, $$Q\gamma = \frac{g}{2q} K (P_2 - P_3) \quad (6)$$

where Q is the mass of the fluid to be measured, and g/2q K is a constant as q is a constant. Thus, the difference between pressure $P_2$ in the venturi 4 and pressure $P_3$ in the venturi 5 becomes proportional to the mass of the flow rate Q. Therefore, a setting may be made by virtue of this fact such that the pressure converter 11 will generate an electric signal expressing the mass flow rate.

If Q is zero and the switch 14 is closed to accordingly close the electromagnetic throttle valve 9, the fluid in the system by operation of the pump 8 circulates through the route consisting of: constant capacity pump 8; passage 7; passage 1; venturi 5; passage 6"; constriction 10; passage 7; and constant capacity pump 8. Its flow rate is 2q.

Therefore, in the venturi 5, $$2q = C.\alpha \sqrt{\frac{2g(P_1 - P_3)}{\gamma}} \quad (7)$$

Here, since the flow rate through the venturi 4 is 0, pressure $P_1$ at the discharge port of the constant capacity pump 8 is equal to pressure $P_2$ in the venturi 4. Therefore, introducing the relation of $C^2.\alpha^2 = K \ldots 8$ the formula (7) gives the following equation:

$$2q = \sqrt{K} \sqrt{\frac{2g(P_2 - P_3)}{\gamma}} \quad (9)$$

Squaring both members of this formula, $$4q^2 = \frac{2g}{\gamma} K (P_2 - P_3) \quad (10)$$

Hence, $$q\gamma = \frac{g}{2q} K (P_2 - P_3) \quad (11)$$

Therefore, if Q is 0, pressure difference $(P_2 - P_3)$ between the two venturis 4 and 5 stays proportional to ½ of the constant discharge 2q of the constant capacity pump 8 even if the system is placed under the influence of temperature and/or other factors. Since 2q is constant, $q\gamma$ can be easily determined by measuring fluid density. Thus, if the calibrating means 11' is adjusted such that the pressure transducer will give the value of ½ of the circulation rate of the constant capacity pump 8 when Q is 0 and the solenoid valve 9 is closed, no error of measurement will occur no matter whether the measuring system is influenced by temperature and/or other factors.

In the flow rate measuring system of the present invention, the flow rate measurement is performed under the condition of $q \geq Q$, and in the full scale flow rate measurement, $Q\gamma = q\gamma$. The fact that calibration can be practiced at the full scale flow rate endorses high precision of the present calibrating method.

The operation for measuring the flow rate in an apparatus adapted with the measuring system of the present invention will now be described. The fluid in the fluid circuit 19 of the apparatus flows into the system from the inlet 2 and passes through the passage 1 or bypass 6 to flow out from the outlet 3. The constant capacity pump 8 is operated to fill the passages of the system with the fluid in said apparatus. Then the valves 17 and 18 are closed and the circuit 21 will have zero mass flow rate Q. The solenoid valve 9 is closed by connecting the switch 14 while keeping the pump 8 in operation. At this time, pressure difference between the venturis 4 and 5 is equal to ½ of the mass of flow that passes the pump 8 as mentioned above, so the calibrating means 11' is adjusted such that the pressure transducer 11 will give the value of ½ of the mass of flow passing the pump 8. Thus adjusted, the pressure transducer 11 can correctly indicate the mass flow rate regardless of whether the system is under the influence of temperature and/or other factors. Then the switch 14 is operated to open the solenoid valve 9 while driving the constant capacity pump 8 to admit fluid into the system from the inlet 2, whereupon the pressure transducer 11 emits an electrical signal expressing the flow rate of the fluid mass to be measured.

Generally, if the flow rate of the fluid to be measured is extremely low, it is difficult to obtain correct measurement as the mass flow rate varies widely. However, according to the system of the present invention, since a substantial portion of the fluid circulates when the flow rate is low, the fluid receives heat from the constant capacity pump 8 as well as from the electric motor that drives the pump, and it is gradually raised in temperature. Therefore, air bubbles tend to be produced in the fluid, but the fluid in the passage 6 is effectively cooled by the cooling means 19 and 20 to permit stable measuring operation of the system.

Figure 2:
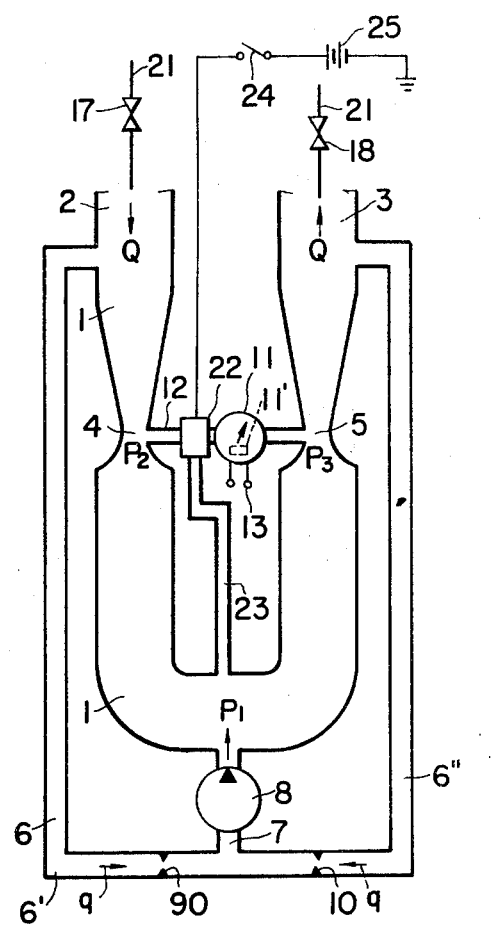
FIG. 2 is a diagram showing a modification of the system of FIG. 1.

In the embodiment of FIG. 2, the solenoid valve 9 of the previous embodiment is replaced by a constriction 90 of the same construction as the constriction 10. Third valve means are provided in the form of an three-way solenoid valve 22 in the passage 12 that connects the venturi 4 and the pressure transducer 11, whereby the venturi 5 is selectively connected either to the venturi 4 through said passage 12 or to a part of the passage 1 between both venturis 4 and 5 through a part of the passage 12 and a passage 23. the drive coil of the three-way valve 22 is connected to a power source 25 through a switch 24 so as to accomplish fluid connection at the time of said selection by operation of said switch.

Now, the mechanisms for expressing the flow rate by pressure difference between the two venturis 4 and 5 and for giving a precise indication of the measured values through adjustment of the calibrating means 11' of the pressure converter 11 even under the influence of temperature and/or other factors will be described.

It is assumed that pressure in the passage 1 at the point into which fluid is discharged from the constant capacity pump 8 is $P_1$, and that pressures in the throats of the respective venturis 4 and 5 are $P_2$ and $P_3$, respectively. If the switch 24 is open, the three-way solenoid valve 22 communicates the throat of the venturi 4 with the pressure transducer 11, so that said pressure converter 11 detects the difference between pressures $P_2$ and $P_3$.

In this case, the arrangement is such that the flow rate Q of the fluid to be measured, which flows into the inlet 2, is either smaller than or equal to the flow rate q through the constrictions 90 and 10. Also, the fluid in the passages 6' and 6'' flows in the directions shown by arrows in the drawing. Since there exists the relationship of $q \geqq Q$ between flow rate through the venturi 4 and pressure drop, the following equation holds:

$$q - Q = C \cdot \alpha \sqrt{\frac{2g(P_1 - P_2)}{\gamma}} \qquad (21)$$

where C is a factor of the apparatus, $\alpha$ is flow coefficient, $\gamma$ is fluid density, and g is gravitational acceleration. As C and $\alpha$ are constants, they may be given as: $C^2 \cdot \alpha^2 = K$.. 22. Therefore, $$q - Q = \sqrt{K} \sqrt{\frac{2g(P_1 - P_2)}{\gamma}} \qquad (23)$$

Likewise, the following formula holds with the venturi 5:

$$q + Q = \sqrt{K} \sqrt{\frac{2q(P_1 - P_3)}{\gamma}} \qquad (24)$$

Subtracting the square of the formula (24) from the square of the formula (23), $$4qQ = \frac{2g}{\gamma} K (P_2 - P_3) \qquad (25)$$

Hence, $$Q\gamma = \frac{g}{2q} K (P_2 - P_3) \qquad (26)$$

Here $Q\gamma$ is the mass of the fluid to be measured, and $g/2q$ K is constant as q is constant, so that the difference between pressure $R_2$ at the venturi 4 and pressure $P_3$ at the venturi 5 becomes proportional to the mass of the flow rate Q. By making use of this fact, a setting is made such that the pressure transducer 11 will emit an electrical signal that expresses the mass flow rate.

Let there now be considered changes which occur when Q is 0; that is, when the switch 24 is closed to change over the three-way solenoid valve 22 to connect the passage 1 between the two venturis 4 and 5 with the pressure converter 11 so that both pressures $P_1$ and $P_2$ will act to the pressure converter 11.

Squaring the formula (24), $$q^2 = \frac{2q}{\gamma} K (P_1 - P_3) \qquad (27)$$

Hence, $$\frac{1}{4} q\gamma = \frac{g}{2q} K (P_1 - P_3) \qquad (28)$$

Thus, if Q is 0, pressure difference ($P_1 - P_3$) between the passage 1 (between the two venturis 4 and 5) and the venturi 5 is proportional to ⅛ of the constant discharge 2q of the constant capacity pump 8 even if the system is under the influence of temperature and/or other factors. Since 2q is constant, ¼ $Q\gamma$ can be easily determined by measuring the fluid density, and when Q is 0, if the calibrating means 11' is adjusted such that the pressure transducer 11 will indicate the value ⅛ of the mass of flow passing the constant capacity pump 8, no error of measurement occurs even if the system is exposed to the influence of temperature and/or other factors.

The fluid in the circuit 21 flows into the system from the inlet 2 through the open valve 17 and passes through the passage 1 or bypass 6 to flow out from the outlet 3 through the open valve 18. Here, the constant capacity pump 8 is operated to fill the passages of the system with said fluid. In this case, the three-way solenoid valve 22 may be switched to any position. Then both the valves 17 and 18 are closed to make the mass flow rate Q zero, and the three-way solenoid valve 22 is switched to connect the pressure transducer 11 with the passage 1 between the two venturis 4 and 5, and then the pump 8 is operated. SInce the pressure difference between the venturi 5 and the passage 1 between the two venturis 4 and 5 is equal to ⅛ of the mass of flow passing the pump 8 as mentioned before, the calibrating means 11' is adjusted such that the pressure transducer 11 will give the value of ⅛ of the flow mass through the pump 8. This allows the pressure transducer 11 to express the correct flow rate even when the system is undergoing the influence of temperature and/or other factors. Then, the three-way solenoid valve 22 is again changed over by the switch 24 to communicate the venturi 4 with the pressure transducer 11 while opening the valves 17 and 18, and the pump 8 is operated to admit fluid in the circuit 21 into the system from the inlet 2, whereupon the pressure transducer 11 emits an electric signal expressing the flow rate of the fluid mass to be measured.

Described below are the results of experiments conducted on a flowmeter (MF-602) constructed according to the embodiment of the present invention shown in FIG. 2. Gasoline ($\gamma = 0.7612$ g/cm$^3$) was used as the fluid to be measured.

Figure 3:
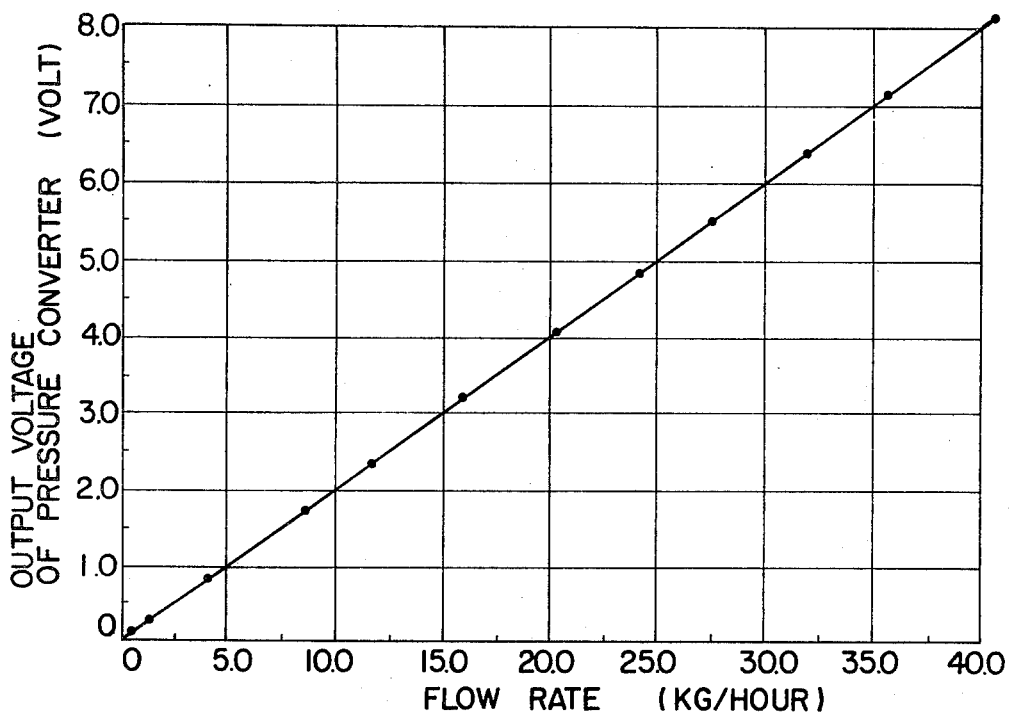
FIGS. 3 and 4 are graphs showing the results of experiments conducted on the system of FIG. 2.

FIG. 3 shows the relationship between the flow rate Q of the fluid flowing in the passage 2 and the output voltage of the pressure transducer 11. This relationship is expressed by a straight line having a grade ($\alpha$) of 0.2000 (v/kg/h). When the switch 24 was turned on, the output voltage of the pressure converter 11 corresponding to ¼q$\gamma$ was 3.01 V.

Then calibration of the calibrating means 11' was changed intentionally to derange the relationship between flow rate and output voltage.

The switch 16 was again turned on and the calibrating means 11' was again adjusted so that the output voltage of the pressure converter 11 will be 3.01 V. The value of $\alpha$ was obtained by measuring with a balance the weight of the fluid that flows through the flowmeter in unit time.

The above process was repeated twice, and the value of $\alpha$ in each process was as follows:
$\alpha_1 = 0.2015$
$\alpha_2 = 0.2008$
$\alpha_3 = 0.1994$ As noted, the errors were held to within ± 1 percent. This fact indicates high precision of operation of this flowmeter.

Figure 4:
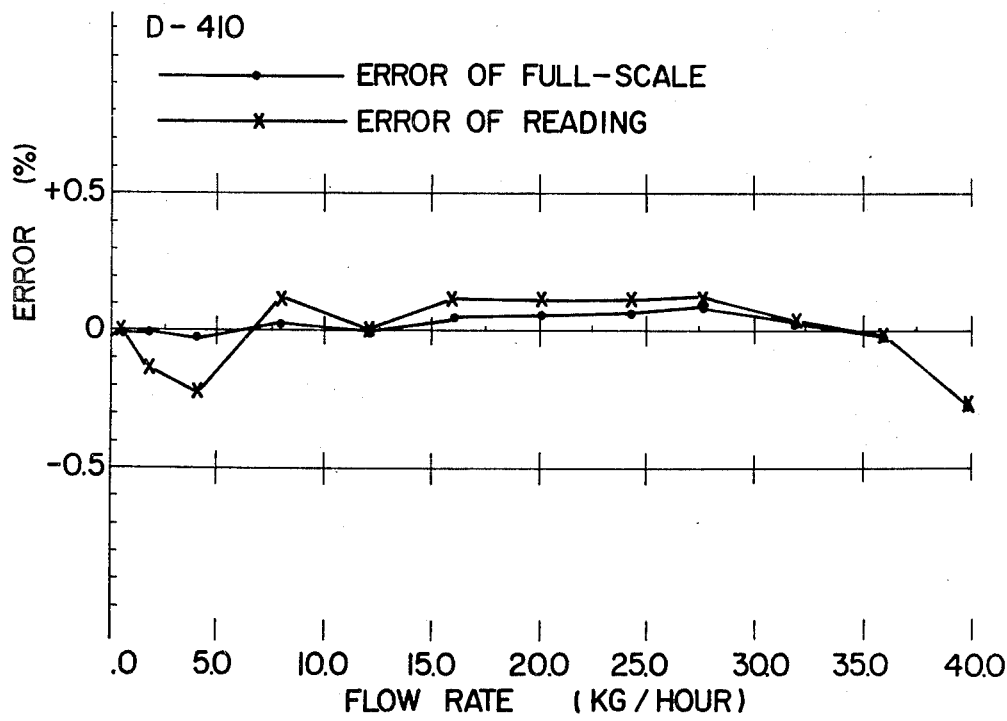

FIG. 4 shows the errors relating to the flow rate. It will be noted that the errors are within 0.3 percent.

While specific embodiments of the invention have been shown and described in detail to illustrate the application of the inventive principles, it will be understood that the invention may be embodied otherwise without departing from such principles.

What is claimed is:

1. A fluid flow rate measuring system comprising first passage means defining a flow path through which fluid flow whose rate is to be measured is passed, inlet and outlet means for said first passage means, first and second valve means disposed, respectively, to open and close said inlet and outlet means, a first venturi and a second venturi downstream of said first venturi disposed within said first passage means, bypass passage means defining a flow path extending in parallel to said first passage means connected between said inlet and outlet means, a constant capacity pump connected between said bypass passage means and said first passage means at a point intermediate said first and second venturis, a pressure transducer including calibration means connected between said first and second venturis for producing a reading indicative of the rate of fluid flow through said first passage means, and third valve means operable between an open and a closed position and located within said system to effect, during closure thereof and during closure of said first and second valve means with said constant capacity pump in operation, a reading from said pressure transducer which is equivalent to a predetermined fraction of the flow rate through said constant capacity pump whereby said pressure converter may be calibrated by adjustment of the reading produced thereby to said predetermined fraction.

2. A system according to claim 1 wherein said third valve means is located within said bypass passage means.

3. A system according to claim 1 wherein said third valve means located between one of said venturis and said pressure transducer.

4. A system according to claim 3 wherein said third valve means is located between said first venturi and said pressure converter.

5. A system according to claim 2 including a constriction located within said bypass passage means between said outlet means and said constant capacity pump, said constriction being configured to provide a throttling resistance to fluid flow passing therethrough, wherein said third valve means consists of a throttle valve located in said bypass passage means between said inlet means and said constant capacity pump and configured to provide to fluid flow passing therethrough a throttling resistance equivalent to the throttling resistance of said constriction.

6. A system according to claim 4 wherein said predetermined fraction is ⅛.

7. A system according to claim 5 wherein said predetermined fraction is ½.

8. A system according to claim 4 wherein a pair of constrictions configured to provide a throttling resistance to fluid flow therethrough are located within said bypass passage means on opposite sides of said constant capacity pump.

9. A system according to claim 4 wherein said third valve means consists of a three-way valve adapted to selectively connect said second venturi to said first venturi and to a point within said first passage means between said first and second venturis through said pressure transducer, said system including connecting means defining a flow passage between said three-way valve and said point in said first passage means between said first and second venturis.

10. A method for calibrating a fluid flow rate measuring system including first passage means defining a flow path through which fluid flow whose rate is to be measured is passed, inlet and outlet means for said first passage means, first and second valve means disposed, respectively, to open and close said inlet and outlet means, a first venturi and a second venturi downstream of said first venturi disposed within said first passage means, bypass passage means defining a flow path extending in parallel to said first passage means connected between said inlet and outlet means, a constant capacity pump connected between said bypass passage means and said first passage means at a point intermediate said first and second venturis, a pressure transducer including calibration means connected between said first and second venturis for producing a reading indicative of the rate of fluid flow through said first passage means, and third valve means operable between an opened and a closed position and located within said system to effect, during closure thereof and during closure of said first and second valve means with said constant capacity pump in operation, a reading from said pressure transducer which is equivalent to a predetermined fraction of the flow rate through said constant capacity pump, said method comprising the steps of closing said first, second and third valve means, continuously operating said constant capacity pump while said first, second, and third valve means are closed, and operating said calibration means to calibrate said pressure transducer to produce a reading equivalent to said predetermined fraction of the flow rate through said constant capacity pump.

11. A method according to claim 10 wherein said third valve means is located between said first venturi and said pressure transducer and wherein said pressure transducer is calibrated to effect a reading thereon equivalent to ⅛ the rate of flow through said constant capacity pump.

12. A method according to claim 10 wherein said third valve means is located in said bypass passage means between said inlet means and said constant capacity pump and wherein said pressure transducer is calibrated to effect thereon a reading equivalent to ½ the flow rate through said constant capacity pump.

* * * * *

UNITED STATES PATENT OFFICE
CERTIFICATE OF CORRECTION

Patent No. 3924445                  Dated December 9, 1975

Inventor(s) Toshiaki Konomi et al

It is certified that error appears in the above-identified patent and that said Letters Patent are hereby corrected as shown below:

In the heading of the Letters Patent [75] should read as follows:

--[75] Toshiaki Konomi, Shizuoka-ken;

Akio Takamura, Tokyo, both of Japan--.

Signed and Sealed this second Day of March 1976

[SEAL]

Attest:

RUTH C. MASON  
*Attesting Officer*

C. MARSHALL DANN  
*Commissioner of Patents and Trademarks*